United States Patent

Kosui et al.

[15] 3,682,196
[45] Aug. 8, 1972

[54] VALVE POSITION INDICATOR AND HYDRAULIC SYSTEM USED THEREWITH

[72] Inventors: Tsuguo Kosui, Nagasaki; Masahiro Seki, Yokohamashi; Shuji Takamatsu, Yokohama; Sakusaburo Kojima, Zushi, all of Japan

[73] Assignees: Mitsubishi Jukogyo Kabushiki Kaisha; Ishukawajima-Harima Jukogyo Kabushiki Kaisha; Yuken Kogyo Company Ltd.

[22] Filed: May 13, 1970

[21] Appl. No.: 36,841

[52] U.S. Cl............................137/553
[51] Int. Cl............................F16k 37/00
[58] Field of Search............137/344, 553; 251/289

[56] References Cited

UNITED STATES PATENTS 3,516,435  6/1970  Schumacher..............137/553

Primary Examiner—Henry T. Klinksiek
Attorney—Steinberg & Blake

[57] ABSTRACT

This invention provides a flow meter type valve position indicator for use in a hydraulic valve control system having a hydraulic valve actuator and a relief valve arranged to limit the hydraulic pressure applied to the valve actuator. The valve position indicator has an indicator element movable relative to a valve position scale having "open" and "shut" position indications and a stop located to stop the indicator element at a point sufficiently far beyond the "open" or "shut" indicating position to allow free movement of the indicator element by flow of hydraulic fluid through the meter due to compression of the fluid while the valve operating pressure rises from its value when the valve reaches the "open" or "shut" position to the limit set by the relief valve.

8 Claims, 7 Drawing Figures

Patented Aug. 8, 1972
3,682,196
2 Sheets-Sheet 1
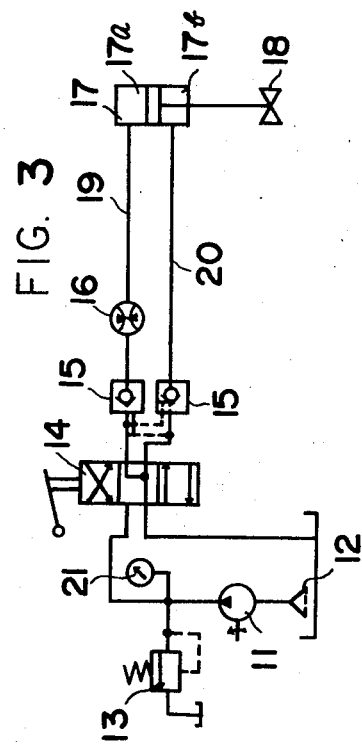
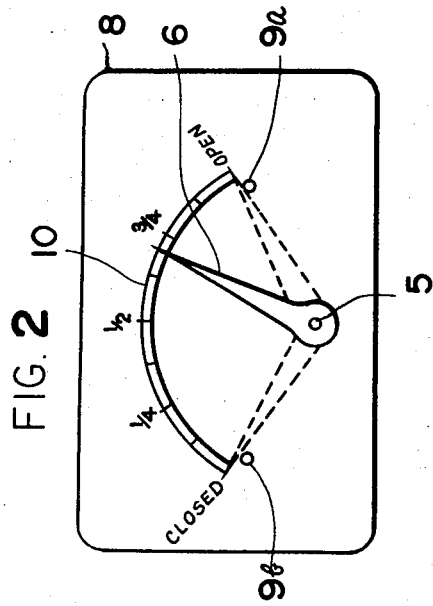
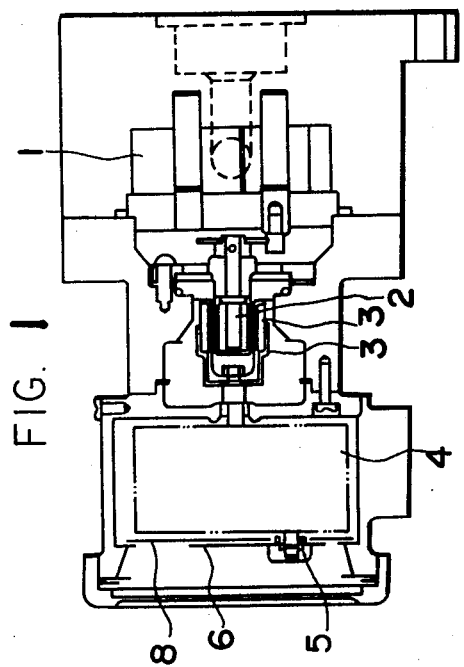
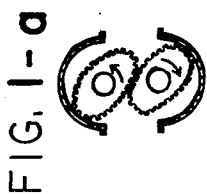
INVENTORS
TSUGUO KOSUI
MASAHIRO SEKI
SHUJI TAKAMATSU
BY SAKUSABURO KOJIMA
Steinberg & Blake
ATTORNEYS

INVENTORS
TSUGUO KOSUI
MASAHIRO SEKI
SHUJI TAKAMATSU
SAKUSABURO KOJIMA

BY Steinberg & Blake
ATTORNEYS

VALVE POSITION INDICATOR AND HYDRAULIC SYSTEM USED THEREWITH

BACKGROUND OF THE INVENTION

This invention relates to flow meter type valve position indicators, that is to say valve position indicators which effectively respond to the amount of hydraulic fluid flowing through them to a hydraulic valve actuator, the principle being that the greater the amount of fluid that has flowed through the meter to the valve actuator, the further the actuator, and hence the valve, has moved towards one of its extreme (i.e. "open" or "shut") positions.

With valve position indicators of this latter type complete accuracy in an indication of the valve position is not always achieved. The reason for this is that when the hydraulic system which controls the valve position has located the valve in its fully closed or in its fully open position, it is still possible for additional fluid to flow into the system because of the compressibility of the hydraulic fluid. At the present time indicators of the above type cannot take into account any compensations for the additional fluid which the system receives until a maximum pressure set by a relief valve is attained, and for this reason certain inaccuracies are necessarily inherent in the conventional indicators.

SUMMARY OF THE INVENTION

It is accordingly a primary object of the present invention to provide a valve position indicator which is capable of compensating for the additional hydraulic fluid received in the hydraulic system after the controlled valve has reached one of its end positions.

It is also an object of the present invention to provide a system of the above type where the indicator can be used not only to indicate that the controlled valve has reached one of its end positions but also to indicate that the pressure in the system has reached the maximum pressure set by a relief valve, so that a special gauge need not be consulted for this latter purpose.

According to the invention the indicator includes a scale having a pair of graduations which respectively indicate when a controlled valve is fully open and fully closed. A hydraulically operated pointer means coacts with this scale for indicating the position of the valve. According to the invention the scale has beyond one of these graduations a portion along which the pointer means can move for indicating the additional fluid which the system receives after the valve has reached the end position corresponding to that indicated by the graduation beyond which the latter scale portion extends.

BRIEF DESCRIPTION OF DRAWINGS

The invention is illustrated by way of example in the accompanying drawings which form part of this application and in which:

FIG. 1 is a schematic illustration of a hydraulically operated valve position indicator;

FIG. 1a is a schematic representation of a flow-responsive mechanism which responds to the flow hydraulic fluid for operating the indicator;

FIG. 2 is a representation of a conventional indicator means;

FIG. 3 is a schematic representation of a hydraulic system in which the invention is incorporated;

DESCRIPTION OF PREFERRED EMBODIMENTS

Figure 4:
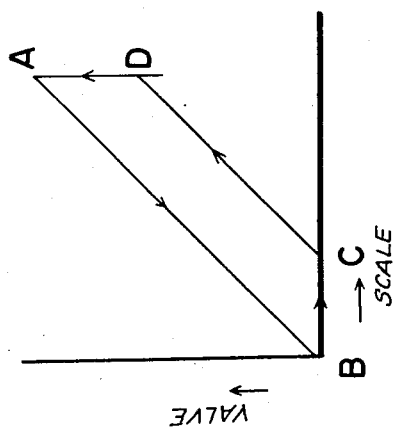
FIG. 4 is a graph representing the operation of an indicator of the type shown in FIG. 2.

The operation of valve position indicators of the type to which the invention relates is most easily explained with reference to FIGS. 2, 3 and 4 of the accompanying drawings. FIG. 2 shows the face 8 of a conventional flow meter type valve position indicator, having a valve position scale 10 provided with "open" and "shut" position indications at respective ends and graduations in between. An indicator element in the form of a needle 6 is movable along the scale 10 up to stops 9a and 9b for stopping the needle 6 at the "open" and "shut" positions. Needle 6 is frictionally mounted on a shaft 5 which is rotated by a flow meter mechanism responding to flow of hydraulic fluid to and from a hydraulic valve actuator (not shown in FIG. 2), so that the needle will be stopped at each end of the scale even though some further flow of fluid and rotation of shaft 5 may occur.

A hydraulic valve control system containing a flow meter valve position indicator 16 which may be of such a conventional type is shown in FIG. 3. Oil flow from reservoir 12 through hydraulic pump 11 goes to a valve actuator cylinder 17 through a directional control valve 14. Maximum hydraulic pressure is limited by a relief valve 13. Check valves 15 are provided for holding the controlled valve 18 in any position.

Now assume the valve 18 is displaced to the closed from the open position. Directional control valve 14 is positioned so as to supply oil to the closing side 17a of the cylinder 17 through pipe 19. Valve position indicator 16 will move from the "open" position towards the "shut" position. The pressure required for operation of valve 18 is generally lower than the pressure limit set by relief valve 13. FIG. 4 shows the relation between the position of the actuator piston and valve and the position of the indicator. The former position is the ordinate and the latter position is the abscissa. On reaching the end of the valve stroke, i.e. the valve having moved from A to B in FIG. 4, the piston in the cylinder will stop and needle 6 will stop against stop 9b at the "shut" position.

Although valve 18 is now fully closed, further fluid flow into the closing side of the cylinder 17a will occur before the relief valve limit pressure is reached, because the fluid has compressibility. In other words, the volume of oil sufficient to increase the cylinder pressure from the normal cylinder working pressure to the maximum pressure as set by relief valve 13 now flows in. As this occurs needle 6, being against the stop 9b, remains stationary while drive shaft 5 slip with respect to pointer 6. Confirmation that the pressure has reached the maximum pressure $P_0$ is given by pressure gauge 21, and then four-way valve 14 can be shifted to its neutral position with pressure $P_0$ held in the pipe line 19 by virtue of check valve 15.

Now consider opening the valve from the fully closed position. Referring to FIG. 4, the start is at B. By shifting the four-way valve 14 line 20 can be pressurized, and check valves 15 are both opened. Pressure $P_0$ held in line 19 is thus released from closing side 17a and drops to a pressure $P_2$ determined by the resistance to flow through a check valve 15 and four-way valve 14. An initial flow occurs, having a volume corresponding to this pressure drop $PP = P_0 - P_2$) and this moves the indicator needle, as indicated in FIG. 4, along line B–C, with no movement of the piston or valve. An actual example will now be calculated to show how much this erroneous movement B–C may be.

Let
| | | |
|---|---|---|
| | pipe 19 inner diameter | 20 mm |
| | pipe length | 300 m |
| | cylinder stroke | 200 mm |
| | cylinder inner diameter | 80 mm |
| | fluid compressibility $\beta$ | $6.7 \times (10-5 cm^2/kg)$ |
| | minimum pressure $P_2$ | 10 kg/cm$^2$ |
| | maximum pressure $P_0$ | 60 kg/cm$^2$ |
| | oil volume in pipe 19 $V_P$ | 94 liter |
| | cylinder stroke volume, | $V_0 = 1.1$ liter |

Then the extra compressed oil volume $V_C$ is:

$$V_C = \beta \times (P_0 - P_2) \times (V_C + V_0) = 6.7 \times 10^{-5} \times 50 \times 95.1$$
$$= 0.335 \text{ liter}$$

So fractional error = $V_C/V_0 = 0.335/1.1 = 0.30 = 30\%$

Thus in a full stroke of the cylinder, there is a 30 percent indication error in this example, but when the valve 18 is held in an intermediate position, the indication error percentage is even larger as the volume B–C is the same at any time. When one-third open is indicated the error will be more than 100 percent. This worst example is not likely to happen in actual practice, but on recent large tankers having hydraulically operated cargo valves, a tendency to increasing errors is becoming evident.

Thus the conventional flow meter type indicator has the disadvantage of erroneous indication and in addition the inconvenience of having to check on a separate gauge that the line pressure has risen to the maximum $P_0$ before shifting the four-way valve 14.

This invention provides a flow meter type valve position indicator for use in hydraulic valve control system having a hydraulic valve actuator and a relief valve arranged to limit the hydraulic pressure applied to said valve actuator, said valve position indicator having an indicator element movable relative to a valve position scale having "open" and "shut" indicating positions, and a stop positioned to stop the indicator element at a point sufficiently far beyond the "open" or "shut" position to allow free movement of the indicator element by flow of hydraulic fluid through the meter due to compression thereof while the valve operating pressure rises from its value when the valve reaches the "open" or "shut" position to the limit set by the relief valve.

Referring to FIGS. 1 and 1a, the valve position indicator mechanism as shown therein is applicable both to conventional indicators and those according to this invention. 1 is a gear type flow measuring device, as shown in FIG. 1a, having a rotatable output shaft 2, 3 is a magnetic coupling, 4 is a reduction gear train designed so that the needle 6 will indicate full cylinder volume at full scale on the dial. Needle 6 is frictionally fixed to the reduction gear output shaft 5 to allow frictional slip, so that on contact with the needle stops 9a and 9b (FIG. 2) the needle will stop regardless of further rotation of output shaft 5. When the needle 6 is not contacting a stop, the needle moves with the reduction gear output shaft 5.

Figure 5:
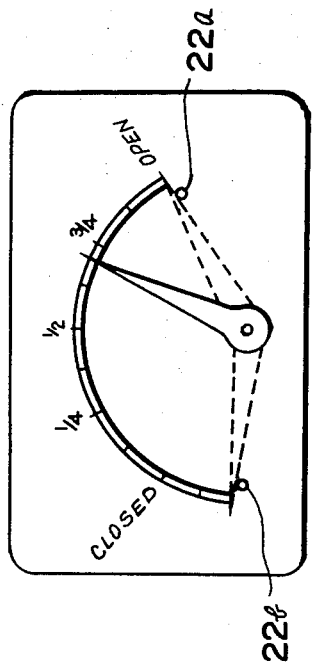
FIG. 5 is an illustration of an indicator means according to the present invention.
Figure 6:
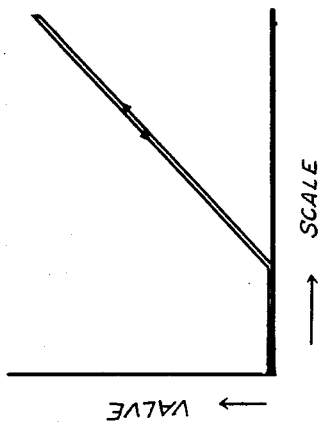
FIG. 6 is a graph illustrating the operation of the indicator means of FIG. 5.

In the embodiment of FIG. 5, an amount of movement of needle 6 equivalent to the fluid volume passing during the compression period is allowed on the scale. The stop 22b at the "shut" end of the scale is positioned so as to stop the needle 6 only at a position sufficiently far beyond the "shut" position to allow free movement of the needle 6 by flow of hydraulic fluid through the meter 1 due to compression of the fluid while the valve operating pressure rises from the value it has when the valve reaches the "shut" position to the limit set by the relief valve 13. Thus when valve is operated as already described from the open to the closed position, the extra flow required to raise the pressure from $P_2$ to $P_0$ will move the needle 6 from the "shut" position on the scale to the displaced stop 22b. On subsequent operation from shut to open, the needle will move first from stop 22b to "shut," which is equivalent to the fluid expansion $\Delta P = P_0 - P_2$. Therefore, the needle does not indicate valve movement until the cylinder piston actually begins its stroke. FIG. 6 shows that the relation of scale indication to actual piston and valve position is then almost the same whether valve is being opened or closed. This has been verified in practice.

Furthermore, confirmation of the pressure rise from the normal working pressure to maximum limit pressure $P_0$ may be made by noting the needle movement from "shut" position to stop 22b. In other words, the extension of the scale acts as a kind of pressure gauge. This saves the time previously required to check a separate pressure gauge to determine complete valve shutting.

Thus, there is produced improved accuracy in the indicator system and more convenient confirmation of reaching the limit pressure.

Although one particular system has been described modification may, of course, be made. For example, the four-way valve may be solenoid- or manually operated, the actuated valve may be of any type, e.g. a butterfly or gate valve, and the valve actuator may be linear or rotary or of other type. Also the valve position indicator may be placed in the hydraulic line to the opening or closing side of the actuator, as desired. If, in FIG. 3, the indicator is placed in line 20, stop 22a near the "open" end of the scale will be the one which is displaced, and the operation will be the same.

What is claimed is:

1. An indicator for indicating the position of a valve which is operated by a hydraulic actuator in a hydraulic control system, comprising a scale having a pair of graduations respectively indicating when the valve is fully open and when the valve is fully closed, and hydraulically driven pointer means adapted to be operatively connected with and operated by the hydraulic system and cooperating with said scale for indicating the position of the valve, and said scale having a portion extending beyond one of said pair of graduations and along which said pointer means moves for indicating flow of hydraulic fluid in the system due to compression of the hydraulic fluid after the valve has reached a position corresponding to that indicated by said one graduation.

2. The combination of claim 1 and wherein said scale includes a pair of stops for said pointer means, one of said stops being situated at the other of said graduations and the other of said stops being situated at the termination of said portion of said scale beyond said one graduation.

3. The combination of claim 1 and wherein said portion of said scale is long enough to allow for indicating compression of the hydraulic fluid in the hydraulic actuator as well as in the remainder of the hydraulic system.

4. In a hydraulic valve control system, valve means movable between open and closed positions, hydraulic actuator means operatively connected with said valve means for displacing the latter between said open and closed positions thereof, hydraulic control means communicating with said actuator means for supplying hydraulic fluid thereto and receiving hydraulic fluid therefrom for controlling said actuator means to bring about movement of said valve means between said open and closed positions thereof, relief valve means communicating with said control means for limiting the maximum fluid pressure therein, and hydraulically operated indicator means communicating with said control means to be operated thereby and including a scale having a pair of graduations respectively indicating when said valve means is fully open and fully closed and a pointer movable along said scale to coact therewith for indicating the position of said valve means, said scale of said indicator means having beyond one of said graduations a portion along which said pointer moves for indicating when excess hydraulic fluid is compressed said control means after said valve means has reached the position corresponding to that indicated by said one graduation and until the pressure of the fluid reaches that for which said relief valve means is set.

5. The combination of claim 4 and wherein said indicator means includes a pair of stops for said pointer, one of said stops being situated at the other of said graduations and the other of said stops being situated at the termination of said portion of said scale beyond said one graduation.

6. The combination of claim 4 and wherein said indicator means is a flow meter type of valve position indicator.

7. The combination of claim 4 and wherein said actuator means includes a cylinder and a piston movable therein, and said control means including conduits communicating with said cylinder respectively at opposite sides of said piston for respectively providing opening movement and closing movement of said valve means, said indicator means being operatively connected with that one of said conduits which when supplied with fluid under pressure situates said valve means at an end position corresponding to that one of said pair of graduations beyond which said portion of said scale extends.

8. The combination of claim 7 and wherein said portion of said scale is long enough to allow not only for compression of the hydraulic fluid in said control means but also for compression of the hydraulic fluid in said actuator means.

* * * * *